United States Patent [19]

Dunn

[11] Patent Number: 4,738,707
[45] Date of Patent: Apr. 19, 1988

[54] APPARATUS FOR SUPPLYING MOLTEN GLASS AND METHOD OF FABRICATING SAME

[75] Inventor: Charles S. Dunn, Granville, Ohio

[73] Assignee: Owens-Corning Fiberglas Corporation, Toledo, Ohio

[21] Appl. No.: 877,629

[22] Filed: Jun. 23, 1986

[51] Int. Cl.⁴ ............................................... C03B 5/20
[52] U.S. Cl. ...................................... 65/346; 14/16.1; 65/135; 65/340; 266/231
[58] Field of Search .................... 65/135, 340, 346; 14/16.1; 52/573; 266/231

[56] References Cited

U.S. PATENT DOCUMENTS

| | | | |
|---|---|---|---|
| 90,263 | 5/1869 | Herthel | 14/16.1 |
| 93,638 | 8/1869 | Parker | 14/16.1 X |
| 279,927 | 6/1883 | Emery | 14/16.1 |
| 3,112,920 | 12/1963 | Strate | 14/16.1 |
| 3,269,820 | 8/1966 | Day et al. | 65/346 X |
| 3,561,939 | 2/1971 | Froberg et al. | 65/346 X |
| 4,003,730 | 1/1977 | Brady et al. | 65/DIG. 4 |
| 4,531,717 | 7/1985 | Hebrant | 266/231 X |

Primary Examiner—Robert L. Lindsay
Attorney, Agent, or Firm—Patrick P. Pacella; Ronald E. Champion

[57] ABSTRACT

A channel made from refractory elements is fabricated without gaps or expansion joints between the refractory elements by supporting the channel upon a movable carriage to accommodate the lengthwise expansion of the channel as the temperature of the channel is increased from room temperature to its operating temperature.

12 Claims, 2 Drawing Sheets

APPARATUS FOR SUPPLYING MOLTEN GLASS AND METHOD OF FABRICATING SAME

TECHNICAL FIELD

The invention disclosed herein relates to apparatus, such as a channel or trough, having a substantial length for containing molten inorganic material, such as glass, wherein the channel is comprised of refractory elements is fabricated without expansion joints along the length thereof.

BACKGROUND

In one system for the production of glass fibers, glass is melted from batch or cullet in a furnace and then delivered in its molten state to the fiberizers and feeders by means of a channel or series of interconnecting channels or troughs. The lengths of these channels can be one hundred feet or more. With such massive lengths, the change in length of the channel as it is heated from room temperature, at which it was fabricated, to its operating temperature, generally in the vicinity of 2000° F., is rather substantial.

Historically, the channels were fabricated from refractory bodies stacked and/or interconnected to form the channel to contain the flow of molten glass therein. To accommodate the substantial longitudinal growth of the channel due to the change in temperature between fabrication and operation, expansion joints, that is, gaps between the refractory bodies were provided at various points along the length of the channel. For example, a gap of about one half inch is provided about every eight to ten feet in a conventional installation.

In theory, with both ends of the channel held relatively fixed, the proper number and size of gaps or expansion joints can be calculated and provided which will then close upon heating of the channel to its desired operating temperature. Unfortunately, practical application of the theory is not always perfect. Some of the gaps fail to close sufficiently thereby permitting molten glass to leak therefrom.

The present invention provides a molten glass delivery channel fabricated without expansion joints while still accommodating its lengthwise thermal expansion.

DISCLOSURE OF THE INVENTION

The present invention pertains to a longitudinally extending apparatus for containing molten inorganic material comprising: a frame extending along the length of the apparatus; a plurality of refractory elements abutting one another to form a channel adapted to contain the molten material, the refractory elements being positioned in abutting relationship along the length thereof without expansion joints therebetween prior to heating; and carriage means for supporting the refractory elements as the channel, the carriage means movably engaging the frame to permit the channel of refractory elements to substantially freely longitudinally expand as the refractory elements are heated.

BEST MODE OF CARRYING OUT THE INVENTION

According to the principles of this invention, the channels, such as forehearths and the like, are fabricated without expansion joints while still accommodating the substantial growth in length therein due to the thermal expansion of the refractory elements and the like as the temperature of the system is raised from room temperature to operating temperature.

Figure 1:
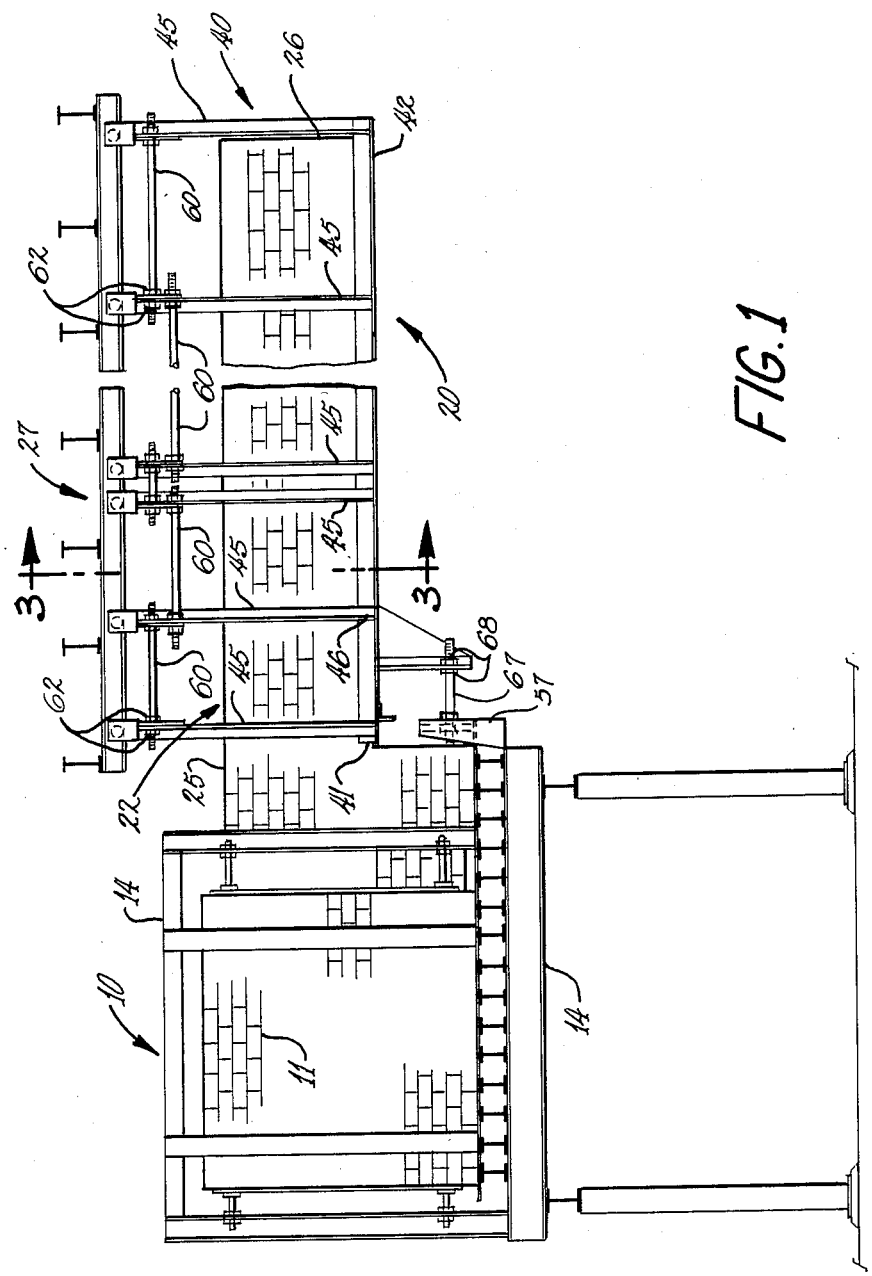
FIG. 1 is an elevational view of a furnace and delivery system according to the principles of this invention.

As shown in FIG. 1, furnace 10 supplies delivery system 20 with a flow of molten glass 19. Furnace 10 is comprised of structural steel framework 14 and refractory elements or bricks 11 as is known in the art. Refractory bricks 11 are arranged to provide a discharge port through which molten glass 19 enters first end 25 of channel 22 of delivery system 20.

Channel 22 is comprised of a plurality of refractory elements 23 abutting one another to form cavity 24 therein to contain the molten material 19. Refractory element 23 may be of any suitable shape or composition. As shown channel 22 is comprised of refractory elements in the shape of rectangular bodies 36, "U" shaped bottom sections 37, siderails 38 and top sections 39. According to the principles of this invention, the refractory elements 23 are positioned in abutting relationship over the length of channel 22 as it is fabricated. That is, channel 22 is fabricated without expansion joints between the refractory elements 23. The fabrication is done at room temperature.

Channel 22 is supported by carriage means 40 which is movably or slideably secured to frame assembly 27. Frame assembly 27 of delivery system 20 may be directly tied to framework 14 of furnace 10, if desired. In any event, frame assembly 27 is preferably substantially fixed with respect to framework 14.

Figure 3:
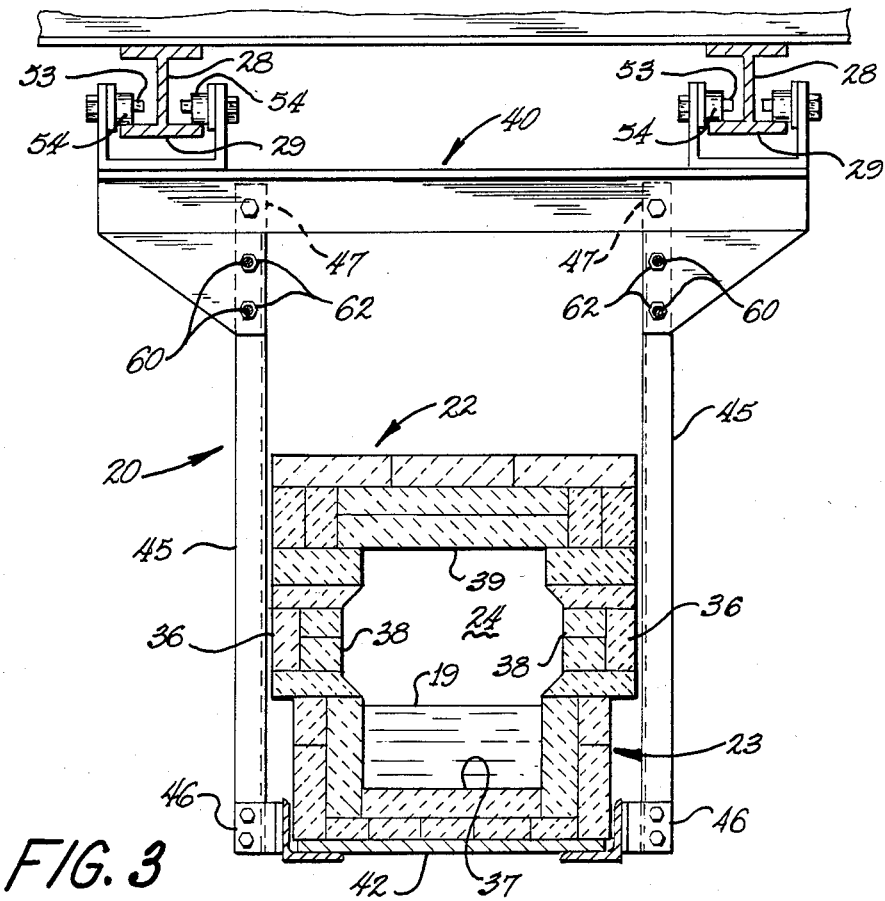
FIG. 3 is a cross-sectional view of the delivery system shown in FIG. 1 taken along view 3—3.

As can be seen in FIGS. 1 and 3, carriage means 40 is comprised of a floor section 42 upon which channel 22 rests, upright members 45 and bearings 52. First ends 46 of upright members 45 are rigidly joined by any suitable means, such as welding and/or mechanical fasteners, to floor section 42. Shaft 53 of each bearing 52 is joined to the second end 47 of the associated upright member 45, and roller 54 of bearing 52 is journaled on shaft 53. Rollers 54 are in contact with flanges 29 of beams 28 of the frame assembly 27 which extends along the length of channel 22.

According to the principles of this invention, only one end of the trough or channel 22 is substantially fixed. If carriage means 40 were not at least adjustably secured at one end, vibrations and other forces could cause carriage means 40 to "walk away" from furnace 10 along frame assembly 27. As shown, first end 25 of channel 22 is held in contact with furnace 10 by adjustably securing first end 41 of carriage means 40 to framework 14 of furnace 10. As shown, threaded rod 67 and associated nuts 68 adjustably secure flange 57, which is rigidly fastened to floor section 42, to framework 14. Relative adjustment between first end 41 of carriage means 40 and furnace framework 14 is conveniently provided by turning the nuts 68 on threaded rods 67 as desired.

Figure 2:
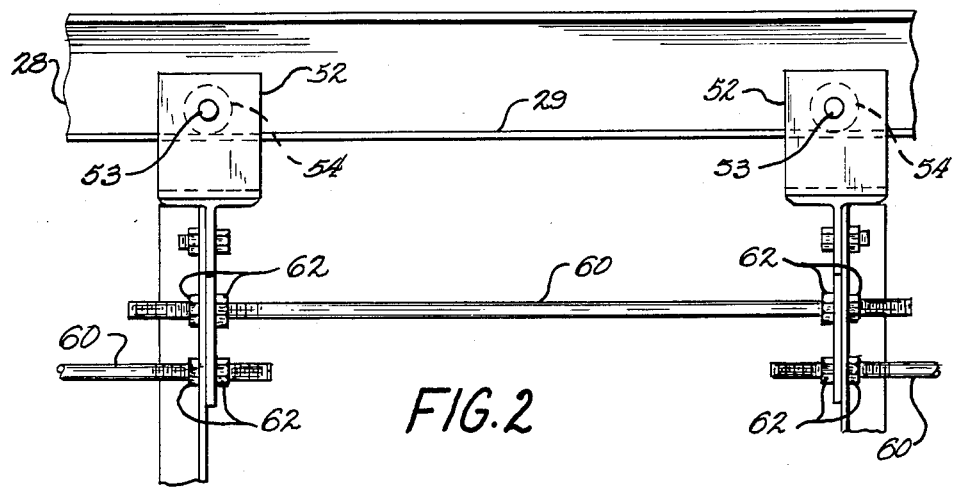
FIG. 2 is an enlarged view of a portion of the carriage portion of the delivery system shown in FIG. 1.

Since the thermal expansion of channel 22, as well as carriage means 40, is not fully predictable or regular, adjustable tying members 60 are provided between adjacent upright members 45 to permit the upright members 45, floor section 42, refractory elements 23 and channel 22 to be maintained substantially in the same relative orientation with respect to each other during and after heating as they were in prior to heating, that is, during fabrication. That is, adjustable tying members 60 are provided to compensate for any tendency for carriage means 40 to warp or buckle as its temperature increases along with channel 22. As shown, in FIGS. 1 and 2 adjustable tying members 60 are comprised of threaded rods 61 and nuts 62 which may be advanced or retarded as desired to maintain a system in proper orientation. Accordingly, threaded rods 61 are positioned in holes in upright members 45.

As shown, carriage means 40 is suspended from frame assembly 27. It is to be understood, however, that a suitable carriage means could be movably or slideably supported from below by any suitable frame assembly, desired. Further it is to be understood that such channels for containing molten glass usually include gas and/or electric heating systems for providing the desired thermal conditioning of the glass. Such heating system have not been shown for the purpose of clarity in describing the present invention.

It is apparent that, within the scope of the present invention, modifications and different arrangements can be made other than as herein disclosed. The present disclosure is merely illustrative with the invention comprehending all variations thereof.

INDUSTRIAL APPLICABILITY

The invention described herein is readily applicable to the glass industry and, in particular, the glass fiber industry.

I claim:

1. A longitudinally extending apparatus for containing molten inorganic material comprising:
    a frame extending along the length of the apparatus;
    a plurality of refractory elements abutting one another to form a channel adapted to contain the molten material, the refractory elements being positioned in abutting relationship without expansion joints therebetween prior to heating; and
    carriage means for supporting the refractory elements as the channel, the carriage means movably engaging the frame to permit the channel to substantially freely longitudinally expand as the refractory elements are heated.

2. The apparatus of claim 1 wherein said carriage means is comprised of:
    a floor section for supporting the refractory elements;
    a plurality of upright members joined to the floor section; and
    a plurality of bearing assemblies joined to the upright members, the bearing assemblies being in rolling contact with the frame to permit the carriage to move along the frame.

3. The apparatus of claim 2 wherein said carriage assembly is further comprised of adjustable tying members joined to the upright members adapted to permit the upright members, floor section and refractory elements to be maintained substantially in the same relative orientation with respect to each other after heating as the floor section, upright members and refractory elements were in prior to heating.

4. The apparatus of claim 3 wherein the tying members are comprised of threaded rods and nuts.

5. A method of fabricating a longitudinally extending channel for containing molten glass comprising:
    providing a frame extending along the length of the channel, the frame being spaced from the channel;
    prior to heating, positioning a plurality of refractory elements in abutting engagement with one another without expansion joints therebetween to form the channel;
    supporting the refractory elements as said channel on a carriage means; and
    movably supporting the carriage means by the frame to permit the channel to substantially freely longitudinally expand as the temperature of the refractory elements increases.

6. The method of claim 5 wherein said carriage is comprised of a floor section for supporting the refractory elements, a plurality of upright members joined to the floor section and movably connected to the frame, and tying members adjustably joined to the upright members and further comprising adjusting the tying members during heating to maintain the floor section, upright members and refractory elements in the same relative orientation with respect to each other during heating as they were in prior to heating.

7. Apparatus for supplying molten glass comprising:
    a furnace for supplying molten glass,
    a plurality of refractory elements abutting one another to form a channel for directing the flow of molten glass issuing from the furnace, the channel having a first end positioned substantially fixed with respect to the furnace, the refractory elements being positioned during fabrication of the channel in abutting relationship without expansion joints therebetween;
    a frame extending along the length of the channel and spaced therefrom; and
    carriage means for supporting the channel, the carriage means movably engaging the frame to permit the channel to freely longitudinally expand as the channel is raised to the desired operational temperature.

8. The apparatus of claim 7 wherein said one end of the carriage is adjustably secured relative to the furnace.

9. The apparatus of claim 7 wherein said carriage means is comprised of:
    a floor section for supporting the refractory elements;
    a plurality of upright members joined to the floor section; and a plurality of bearing assemblies joined to the upright members, the bearing assemblies being in rolling contact with the frame to permit movement between the frame and carriage.

10. The apparatus of claim 9 wherein said carriage assembly is further comprised of adjustable tying members joined to the upright members adapted to permit the upright members, floor section and refractory elements to be maintained substantially in the same relative orientation with respect to each other after heating as the floor section, upright members and refractory elements were in prior to heating.

11. A forehearth for conveying molten material from a melting furnace comprising:
    (a) A plurality of refractory elements abutting one another to form a channel adapted to contain the molten material, the refractory elements being positioned in abutting relationship without expansion joints there between;
    (b) A floor section for supporting the refractory elements;
    (c) A plurality of upright members joined to the floor section;

(d) Adjustable tying members jointed to and interconnecting said upright members;
(e) A plurality of bearing assemblies each of which is joined to each upright number;
(f) A frame rigidly attached to said melting furnace; and
(g) Said bearing assemblies being in rolling contact with said frame to permit the channel to substantially freely longitudinally expand as the refractory elements are heated.

12. A method of fabricating a forehearth for conveying molten material from a melting furnace comprising the steps of:
(a) Positioning a plurality of refractory elements in abutting relationship without expansion joints there between to form a channel adapted to contain molten material;
(b) Supporting the channel of refractory elements with a floor section;
(c) Attaching a plurality of upright members to the floor section;
(d) Interconnecting each upright member to an adjacent upright member with adjustable tying members;
(e) Attaching a bearing assembly to each upright member;
(f) Rigidly attaching a frame to the melting furnace; and
(g) Placing said bearing assemblies in rolling supported contact with said frame to permit the channel to substantially freely longitudinally expand as the refractory elements are heated.

* * * * *